US010298699B2

(12) United States Patent
Jurgenson et al.

(10) Patent No.: US 10,298,699 B2
(45) Date of Patent: May 21, 2019

(54) PHYSICAL LOCATION DETERMINATION OF INTERNAL NETWORK COMPONENTS

(71) Applicant: Microsoft Technology Licensing, LLC, Redmond, WA (US)

(72) Inventors: Tom Jurgenson, Tel Aviv (IL); Tal Arieh Be'ery, Petach Tikva (IL); Idan Plotnik, Savion (IL); Michael Dubinsky, Tel Aviv (IL); Sivan Krigsman, Herzeliya (IL); Gil David, Zichron Yaakov (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 124 days.

(21) Appl. No.: 15/260,314

(22) Filed: Sep. 8, 2016

(65) Prior Publication Data
US 2018/0069934 A1    Mar. 8, 2018

(51) Int. Cl.
*H04W 8/22* (2009.01)
*H04L 29/08* (2006.01)
*H04W 4/029* (2018.01)
*H04W 64/00* (2009.01)

(52) U.S. Cl.
CPC .............. *H04L 67/18* (2013.01); *H04W 4/029* (2018.02); *H04W 8/22* (2013.01); *H04W 64/00* (2013.01)

(58) Field of Classification Search
CPC ...... H04L 67/18; H04W 64/00; H04W 4/029; H04W 8/22; H04W 4/028
See application file for complete search history.

(56) References Cited

U.S. PATENT DOCUMENTS

| 6,493,810 | B1 | 12/2002 | Pang et al. |
| 7,340,488 | B2 | 3/2008 | Blanco et al. |
| 8,255,378 | B2 | 8/2012 | Ji et al. |
| 8,788,437 | B2 | 7/2014 | Prieditis |
| 8,935,742 | B2 | 1/2015 | Nice et al. |
| 9,160,740 | B2 | 10/2015 | Zhang et al. |

(Continued)

FOREIGN PATENT DOCUMENTS

WO    2009058561 A1    5/2009

OTHER PUBLICATIONS

"International Search Report and Written Opinion Issued in PCT Application No. PCT/US2017/049799", dated Nov. 16, 2017, 14 Pages.

(Continued)

*Primary Examiner* — Michael A Keller
(74) *Attorney, Agent, or Firm* — Merchant & Gould (57) ABSTRACT

The present disclosure provides for improved computational efficiency and security in a network by determining the physical location of network connected components, without requiring the components to self-locate. The locations of devices remotely connected to a site within the network are geolocated so that the physical location of that site may be inferred from a centralized point to the remote devices' locations. This calculate site location may be compared against a known site location to improve a generalized algorithm for determining the calculated location of a site with an unknown location, and may be applied to devices that are locally connected to the network, which may be otherwise incapable of being geolocated.

19 Claims, 7 Drawing Sheets

(56) References Cited

U.S. PATENT DOCUMENTS

| | | | |
|---|---|---|---|
| 9,467,476 B1* | 10/2016 | Shieh | H04L 63/20 |
| 2003/0023587 A1 | 1/2003 | Dennis et al. | |
| 2004/0254988 A1* | 12/2004 | Rodriguez | G06Q 10/107 |
| | | | 709/206 |
| 2005/0071643 A1 | 3/2005 | Moghe | |
| 2006/0090136 A1 | 4/2006 | Miller et al. | |
| 2007/0112616 A1* | 5/2007 | Shubov | G06Q 10/04 |
| | | | 705/7.25 |
| 2008/0089336 A1 | 4/2008 | Mercier et al. | |
| 2008/0318596 A1 | 12/2008 | Tenny | |
| 2010/0208898 A1 | 8/2010 | Acar et al. | |
| 2011/0119370 A1* | 5/2011 | Huang | H04L 43/14 |
| | | | 709/224 |
| 2011/0176523 A1 | 7/2011 | Huang et al. | |
| 2012/0151565 A1 | 6/2012 | Fiterman | |
| 2013/0254857 A1* | 9/2013 | Bajenov | G06F 21/00 |
| | | | 726/7 |
| 2014/0036768 A1* | 2/2014 | Gao | H04W 48/16 |
| | | | 370/328 |
| 2014/0274113 A1* | 9/2014 | Teed-Gillen | H04W 64/00 |
| | | | 455/456.1 |
| 2014/0282043 A1* | 9/2014 | Manber | H04L 65/403 |
| | | | 715/739 |
| 2015/0078262 A1* | 3/2015 | Irigi | H04W 72/048 |
| | | | 370/329 |
| 2015/0312722 A1 | 10/2015 | Mori et al. | |
| 2015/0328547 A1* | 11/2015 | Uriu | A63F 13/795 |
| | | | 463/42 |
| 2016/0043993 A1* | 2/2016 | Gupta | H04L 61/3025 |
| | | | 709/245 |
| 2016/0134428 A1* | 5/2016 | Ouyang | H04L 12/1822 |
| | | | 709/204 |
| 2018/0013743 A1* | 1/2018 | Shyamsunder | H04L 67/10 |

OTHER PUBLICATIONS

"Detecting Compromised User Credentials", Published on: Apr. 15, 2016, Available at: https://fortscale.com/solutions/use-cases/comprised-credentials/.

* cited by examiner

PHYSICAL LOCATION DETERMINATION OF INTERNAL NETWORK COMPONENTS

BACKGROUND

Knowing the physical location of a device connected to an internal network can allow the network administrators to improve the security of the network and to improve the efficiency of the network and the devices connected to that network. To obtain this information, however, network administrators often rely on the device self-reporting its location (e.g., via global positioning system (GPS) coordinates) or hand-reporting of a device's location. Self-reporting requires the device to send its coordinate data to the network, consuming additional bandwidth, and can be spoofed by malicious parties; providing the network administrators with incorrect coordinates. Hand-reporting of a device's location requires the manual entry of a location each time a device is moved, which is time consuming, prone to inaccuracies, and inoperable in the event of theft or poor checkout procedures.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Systems and methods for determining the physical location of a networked entity without relying on a device to provide real world location data to the network are described in the present disclosure. Example use cases of these systems and methods are discussed in relation to efficient datacenter positioning, although one of ordinary skill in the art will appreciate other use cases. Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

As will be understood, a network can be divided into various sites, which correspond to physical locations in the real world where the servers reside, so that remote users can connect to the site that is closest to them to access the services and data stored in the network. For example, a cloud-based service may have sites located in New York and Tokyo, where residents of New York will connect to the New York site and residents of Tokyo will connect to the Tokyo site to receive the lowest latency connection. Sites may be connected to by user accounts from devices that are remote from the site or local to the site.

Each site is enabled to learn the location of the remote devices connected to the network by monitoring and logging the VPN (or other network tunnel) traffic used to connect the device to the network. As users connect to a given site in the network, the site will use the Internet Protocol (IP) or other address associated with the devices to perform geolocation for the connected devices. Each site aggregates the geolocation information for selected accounts connected to that site over a period of time to estimate a calculated location for its own physical location. User accounts that access the site via local devices (i.e., not via a VPN or network tunnel) and use an internal IP address can be assigned a location equal to the site's location (calculated or physical), but may be excluded from the aggregation of geolocation information.

By determining the calculated location for a site, the network administrators may determine new physical locations to set up sites that will be closer to their users' remote locations to provide remote users with lower latency connections. Network administrators may determine multiple calculated locations for a site based on dividing the user accounts housed on a given site into clusters to provide the administrators with potential locations to set up additional sites when expanding the network or splitting a given site. Network administrators may also combined the location information for the user accounts housed on multiple sites to determine a central location for the user base when combining sites or otherwise shrinking the network's physical footprint.

By employing the present disclosure, the functionality of the devices may be improved by reducing the amount of data that need to be transmitted to the network to implement location based administration, and thereby gain the benefits in speed and security associated with location based administration of the network among other benefits. The efficiency, security, and reliability of the network itself may also be improved by improving the reliability of the location data received by the network and reducing the amount of data that the network receives to determine the location of a given device.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

By using the network address information of devices that remotely log into a system (e.g., Internet Protocol (IP) addresses), the physical locations of those devices may be determined through geolocation without requiring those devices to self-locate. The aggregated geolocations for the devices connecting to a node of the system are then used to infer a location of that node, which may then be assigned to devices that are locally connected to that node, which may otherwise be un-locatable via geolocation.

Figure 1:
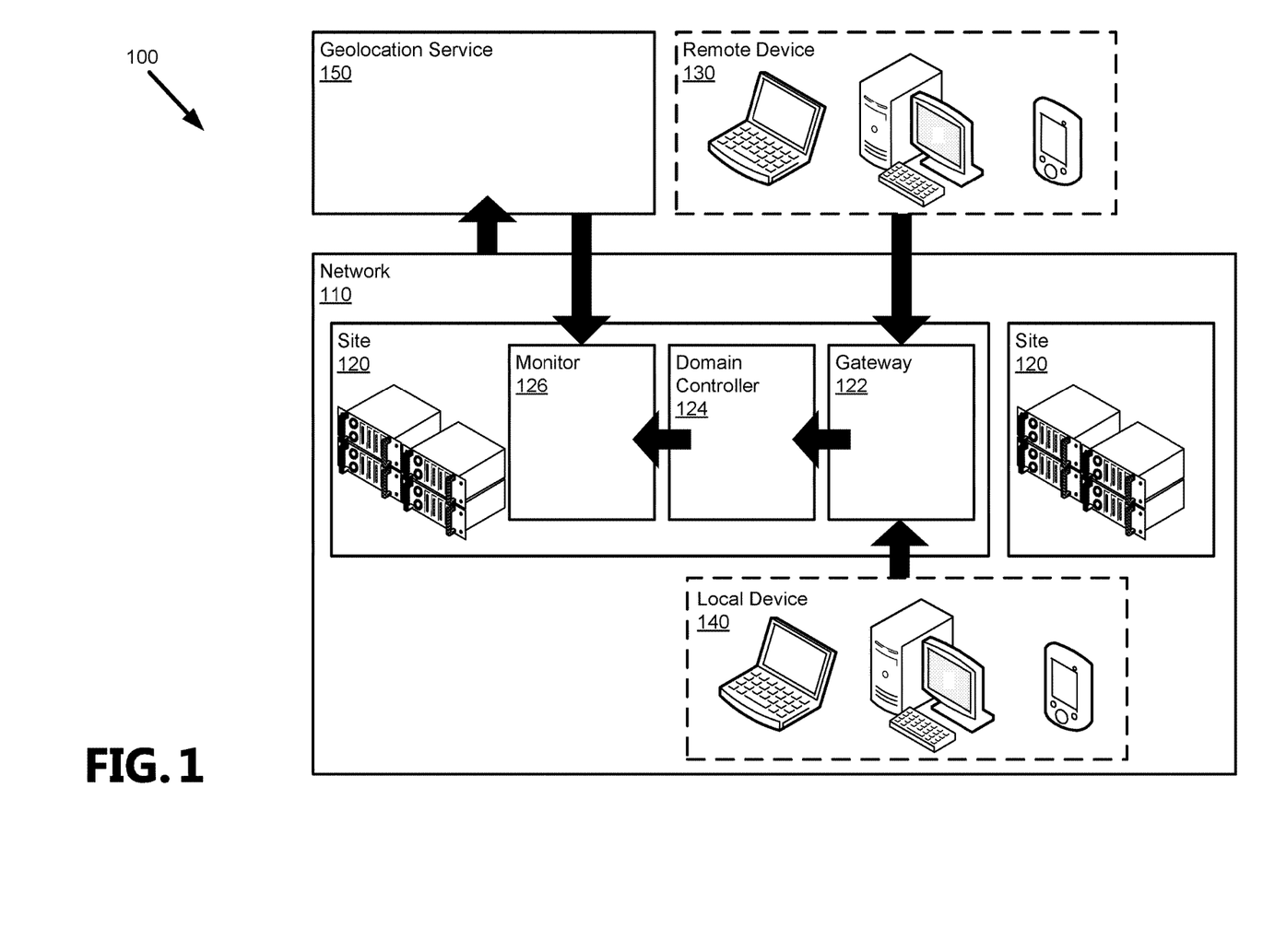
FIG. 1 illustrates an example environment in which the present disclosure may be practiced.

FIG. 1 illustrates an example environment 100 in which the present disclosure may be practiced. As illustrated, an enterprise network 110 is divided into multiple sites 120. A given site 120 may be accessed remotely by a remote device 130, which is located externally to the enterprise network 110 or remotely from the sites 120, or may be accessed locally by a local device 140, which is located internally to the enterprise network 110 or locally to the sites 120. The enterprise network 110 is in communication with a geolocation service 150 to provide locational data for the remote devices 130. Although two sites 120, one remote device 130, and one local device 140 are illustrated, the number of sites 120, remote devices 130, and local devices 140 may be greater than or less than what is illustrated in the example environment 100.

The enterprise network 110 provides a single operating environment over which computing devices may interact despite being spread across multiple sites 120 and domains (e.g., for a company, a governmental agency, an educational institution spread over a large geographical area). Each site 120 of the enterprise network 110 includes: a gateway 122, operable to accept communications from devices connecting to the site 120; a domain controller 124, which is in communication with the gateway 122 and operable to authenticate entities seeking to access the enterprise network 110; and a monitor 126, in communication with the domain controller 124, and operable to aggregate connection information from the remote devices 130 to manage entity location data. Gateways 122 and domain controllers 124 will be understood by one of skill in the art to include hardware devices and software running on those devices to provide the functionalities thereof. In various aspects, the monitor 126 may be run on dedicated hardware or may be provided via software on a computing device used for several purposes, such as, for example, on the same hardware as the domain controller 124. In additional aspects, the enterprise network 110 may make use of fewer monitors 126 than sites 120; some or all of the sites 120 may share a monitor 126.

The remote device 130 and local device 140 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers. The hardware of these computing systems is discussed in greater detail in regard to FIGS. 4, 5A, and 5B.

Remote devices 130 and local device 140 are operated by users, who may be humans or automated systems (e.g., "bots") that request connections to one or more sites 120 of the enterprise network 110. For example, an instance of the SIRI®, GOOGLE NOW™ or CORTANA® electronic assistant (available from Apple, Inc. of Cupertino, Calif.; Alphabet, Inc. of Mountain View, Calif.; and Microsoft, Corp. of Redmond, Wash., respectively) may request a connection in response to or in anticipation of queries from a human user.

The remote device 130 and local devices 140 access the enterprise network 110 by being authenticated by a domain controller 124 of a site 120. Remote devices 130 may connect to a given site 120 via a Virtual Private Network (VPN) connection or other tunnel to initiate a session, whereas local devices 140 connect to the site 120 at which they are located. Whether a given device is a remote device 130 or a local device 140 depends on how it connects to the enterprise network 110, and a given device may be both a remote device 130 and a local device 140. For example, a user may use a local device 140 while in the office to connect locally to the enterprise network 110 and take that device home and log into the enterprise network 110, making the device a remote device 130 for the remote session.

In various aspects, the user may specify a particular site 120 to log into, or the site 120 that is connected to may be automatically selected by a login agent running on the user's device based on a determination of the site 120 that is physically closest to the user, the site 120 that responds fastest to the user's communications (e.g., to avoid network congestion, to connect to a site 120 that has a better ping despite being located further away), etc.

Entities (devices or user accounts) that frequently connect to a given site 120 may be noted and mapped by either the domain controller 124 or the monitor 126 as using the given site 120 as their "home" site 120, whereas entities that infrequently connect to the given site 120 may be noted as connecting to a "guest" site 120. In one aspect, entities are mapped to the one site 120 on which they are most active (locally, remotely, or locally and remotely), while in other aspects a given entity may have "home" status on more than one site 120 or on no sites 120 based on a minimum number of connections to a given site 120. For example, a user based out of Office A and whose account is associated with a first site 120 as a "home," may be transferred to Office B and begin using a second site 120 associated with Office B more frequently. The example user's account may be remapped to the second site 120 as a "home" over the course of several days/weeks/months as the user connects to Office B more frequently than Office A's site 120. Contrarily, if the example user used (and left) a first device at Office A and the user were assigned a new device at Office B, the first device may remain associated with the first site 120 as its "home." In another example, a salesperson who frequently travels and logs on remotely to a first site 120 and a second site 120 may have each site 120 consider itself the "home" of the user's account due to the frequency at which the salesperson connects to each site 120 and the salesperson exceeding a minimum number of connections to each site 120 during a time period. When the monitor 126 determines the calculated location of the site 120, it may exclude the location information from "guest" entities, provide greater emphasis on the location information from "home" entities, or treat the location information equivalently, regardless of home/guest status. The monitor 126 may also periodically reevaluate whether a given entity has home or guest status on a given site 120.

The monitor 126 will observe the network address information from remote devices 130 connecting to the associated site 120 and will decide whether to store those addresses for use when inferring a calculated location of the site 120. Each time a user account successfully logs into the site 120 and establishes a session on the enterprise network 110, the monitor 126 may store the address information associated with the login request, or the monitor 126 may filter or restrict the number of logins from a given user account for a given time period for which to store the address information. For example, a user of a remote device 130 with an intermittent Wi-Fi signal may repeatedly gain and lose connection to the site 120, and may be forced to constantly re-authenticate with the domain controller 124, which the monitor 126 may choose to treat as multiple successful login attempts or as a single login attempt if the attempts fall within a given time range of one another (e.g., an hour, a day, a week). Alternatively, the monitor 126 may collect all of the address information and later filter it when determining the calculated location of a given site 120.

Local devices 140 may also have their connection attempts to the domain controller 124 and activity session logged by the monitor 126 for security purposes. As will be appreciated, local devices 140 are associated with IP addresses internal to the enterprise network 110, which may be masked for use within the enterprise network 110, and therefore may produce spurious results if provided to the geolocation service 150. The monitor 126 will note the entities associated with the login and session (e.g., the user account and devices), and will assign the location (calculated or physical) of the site 120 to the entity at the time of login. For example, a user account for a user entity or Media Access Control (MAC) address, serial number, etc., for a device entity may be tracked to determine whether a second login using the same entity identifiers occurring at a second time violates one or more security rules for the user account.

In various aspects, the monitor 126 may store and use, store and filter, or exclude from storage connection attempts that were rejected by the domain controller 124 (e.g., an incorrect username or password were provided). Similarly, the monitor 126 may store and filter (or block from storage) connection attempts received from a list of addresses that are associated with blocked parties, unreliable geolocation, or whose duration or number of connections meet an unreliability threshold (e.g., multiple short connections may indicate an unstable connection, and may be filtered out or ignored). For example, a user making use of a VPN connection from a smartphone may have a signal routed through a cell-provider's network to reach the site 120, and the address of the cell-provider's network is provided to the monitor 126 instead of the remote device's 120 address internal to the cell-provider's network, making the address unreliable for geolocation, which may be flagged for the monitor 126 or noted over time by the monitor 126 as being unreliable based on the Internet Service Provider (ISP) frequently providing IP addresses unreliable for geolocation. Additionally, the monitor 126 may filter out data from connection attempts that are beyond a preset distance from a site 120 or that specify a specific site 120, as their inclusion may affect the calculation of the location of the site 120.

When the monitor 126 uses the address to determine the calculated location of the site 120, the stored addresses that are to be used are transmitted to the geolocation service 150, which returns a geographic location associated with the address. Examples of geolocation services 150 include, but are not limited to MaxMind of Waltham, Mass. and NeuStar of Sterling, Va., which provide geographic coordinates correlated to IP (or MAC) addresses back to the monitor 126. The geographic coordinates may be provided in terms of latitude/longitude coordinates, cities, regions, and countries. Geographic coordinates may be requested in real-time (as entities connect) or held in batches for periodic (e.g., daily, weekly, monthly) or on-demand processing by the geolocation services 150.

Figure 2A:
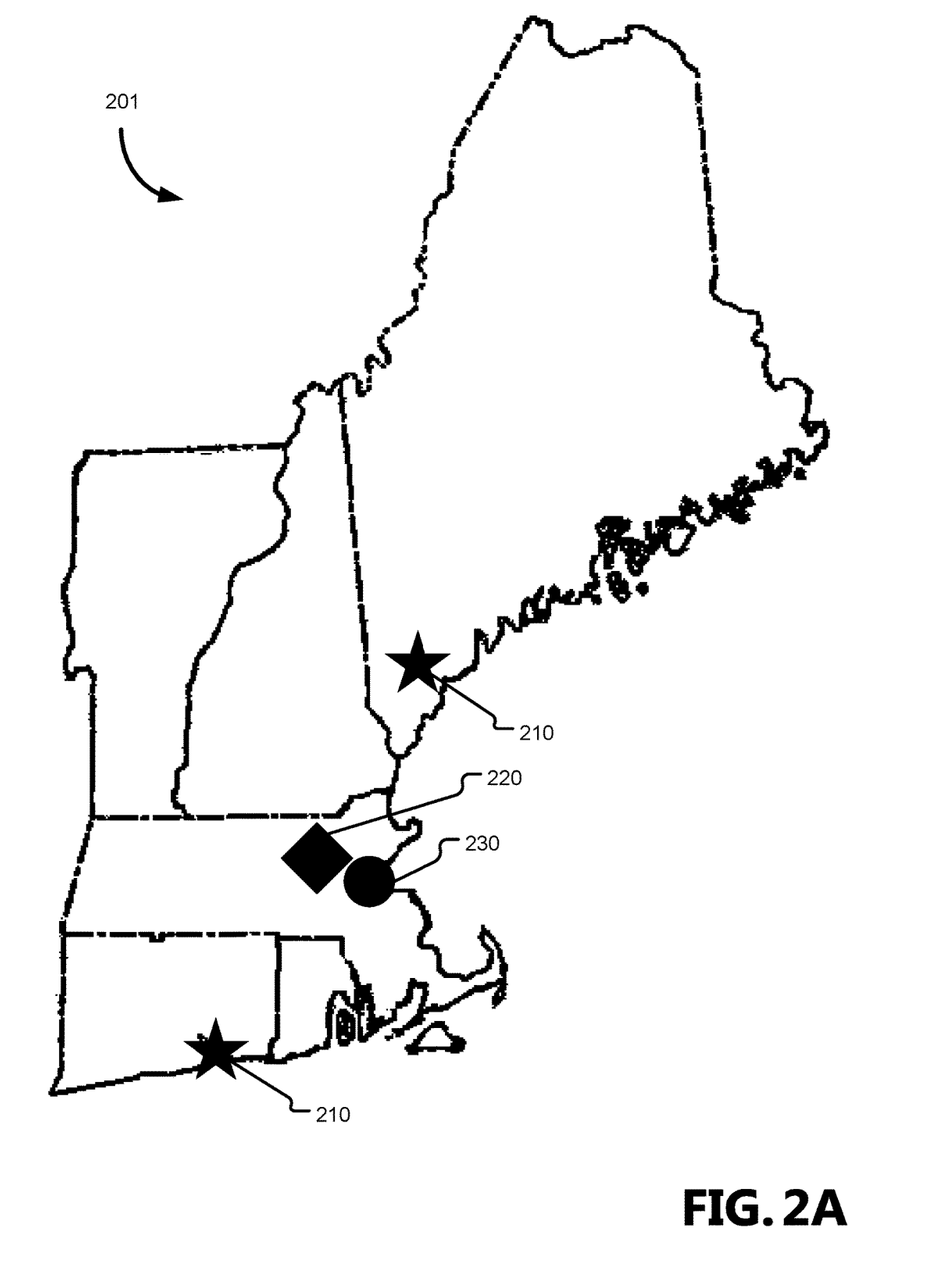
FIGS. 2A and 2B illustrate example maps against which the locations of remote logins and sites are plotted.

FIG. 2A illustrates a first example map 201 against which the positions of located remote logins 210 are plotted. Also plotted are the calculated site location 220 and the physical site location 230. Each located remote login 210 is associated with the geolocation provided by the geolocation service 150 and the time at which it was made to the enterprise network 110. Using these data, the monitor 126 is operable to infer a centralized location to the remote connections to use as the calculated site location 220. As more located remote logins 210 are used, the inference of the calculated site location 220 can be made more accurately, and the monitor 126 may apply additional filtering to which geographic data and login data are used in the calculations.

As will be appreciated, various algorithms and methods may be used to determine the centralized location for use as the calculated site location 220. In one aspect, arithmetic mean values are calculated for the latitude and longitude from the latitudes and longitudes of the geolocation values of the located remote logins 210. In another aspect, when the geolocation values are not provided as latitude/longitude coordinates, but as the name of a city, region, or country, the monitor may use the mode of the geolocation values from the located remote logins 210 or may convert the non-coordinate geolocation values into a latitude/longitude pair of coordinate for a central location of the city, region, or country.

In various aspects, different weights may be applied to the geolocation values based on the frequency of use of a given identifier, a physical or temporal proximity of one login attempt to another login attempt, a physical proximity to the centralized location (which may be calculated recursively), a given time range at which the located remote login 210 was made (e.g., during business hours, on a weekday), and whether the identifiers are unique during the period being calculated. The monitor 126 may also account for geographic and geopolitical data when calculating the centralized location, such as, for example, to avoid placing the centralized location in a body of water, across a national/provincial border, on a road, in a use-restricted space (e.g., a park, a facility known to be used by another entity, an area zoned for residential use when a commercially zoned area is required), an area with high crime/taxes/rents, etc., or to specifically place the centralized location in a given nation/province/city/neighborhood.

In aspects where the coordinates of the physical site location 230 are known to the monitor 126, the monitor 126 may apply machine learning techniques to vary the weights or hyperparameters of the learning algorithm to match the calculated site location 220 to the physical site location 230 and apply the adjusted weights and hyperparameters in subsequent calculations for sites 120 that do not have a known physical site location 230 or to identify hypothetical locations for sites 120 when expanding, contracting, or otherwise modifying the physical footprint of the enterprise network 110.

The calculated site location 220 may be provided as a recommendation to network administrators for new locations for a given site 120, used for network load balancing, or may be assigned as a location for local devices 140 (which may still be mobile devices that can be present at several sites) for security purposes.

Figure 2B:
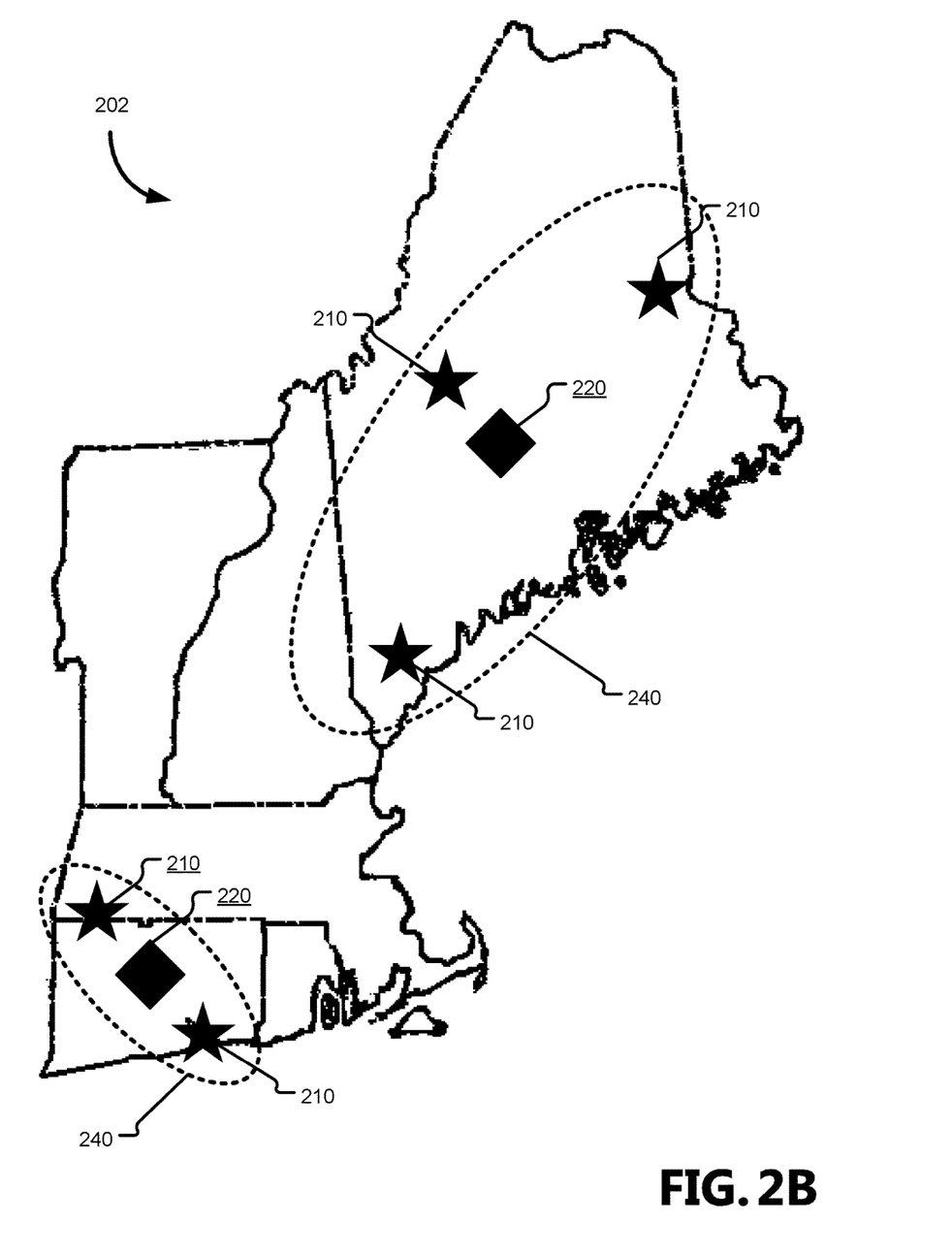

FIG. 2B illustrates a second example map 202 against which the positions of located remote logins 210 are plotted. As plotted, the entities are divided into subgroups 240

(illustrated as a dotted line surrounding multiple located remote logins 210 of the plurality) to produce a calculated site location 220 for each subgroup 240. Additionally, the subgroups 240 may be created based off of an individual entity's use patterns to determine the point about which the entity's remote logins are centered. Subgroups 240 may be set according to criteria specified by the network administrators (e.g., entities connecting at least X times per month, entities at least X km away from a given point, entities within X km of a given point, a specified entity or entities) or may be identified automatically by the monitor 126 according to a clustering or distribution algorithm (e.g., k-means, DBSCAN).

The monitor 126 is operative to use the calculated site locations 220 for subgroups 240 as the located remote login 210 to recursively find centralized locations, or may provide the calculated site locations 220 for the subgroups 240 as suggestions for new locations for a site 120. In another example, the monitor 126 may use the located remote logins 210 associated with multiple sites 120 to determine a single centralized location, which may be provided as a recommendation to the network administrators as a site to condense sites 120 into, or a shared calculated location to use for local devices 140 that may connect to one or more sites located throughout a campus.

Figure 3:
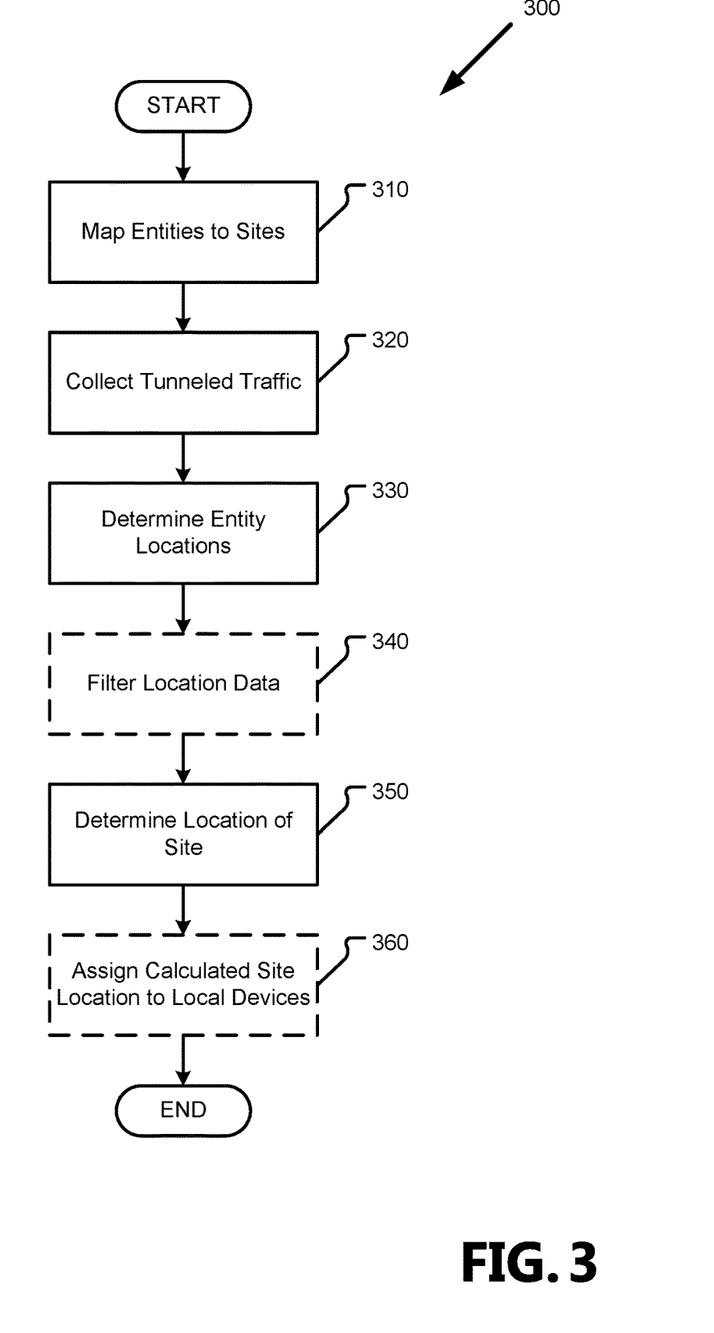
FIG. 3 is a flow chart showing general stages involved in an example method for determining the physical location of network components.

FIG. 3 is a flow chart showing general stages involved in an example method 300 for determining the physical location of network components. Method 300 operates passively on each site 120; that is without requiring remote devices 130 to transmit their own location data, which may be unreliable, and without requiring administrators to keep track of the location of network components, thus improving the security of the enterprise network 110 and the computational efficiency of the components therein.

Method 300 begins at OPERATION 310, where entities are mapped to sites 120. A given entity may be mapped to the one site 120 that the entity is most active on, or an entity may be mapped to sites 120 to which the entity connected to a set number of times within a given time period. The site 120 to which the entity is mapped is considered the "home" site 120 for that entity and other sites 120, which the entity may connect to are considered "guest" sites 120 for the entity. For example, if a user account is noted as connecting to a first site 120 twice within the last month and to a second site 120 once in the last month, the user account may have home status on the first site 120 and guest status on the second site 120. Alternatively, if the network administrators set a threshold for home status of three connections within a month, the example user account may have guest status on both the first site 120 and the second site 120. In yet another alternative, if the user account connected to both the first site 120 and the second site 120 an equal number of times within a given time period, the home status for the entity may be given for both sites 120, the site 120 that the entity connected to first or last may be considered the "home" site 120, or the site 120 with the fewest entities with home status may be mapped for the entity.

Method 300 proceeds to OPERATION 320, where tunneled traffic is collected at a site 120 of the enterprise network 110. Tunneled traffic is received from remote devices 130 connecting to the site 120, and may include only requests that have been authorized by the domain controller 124 of the site 120 and from entities that are mapped to the given site 120 or may include requests from entities that are guests to the site 120 and/or were rejected by the domain controller 124 (which may be later filtered out at OPTIONAL OPERATION 340). Activities from the remote devices 130 are associated with timestamps in the site 120, and the monitor 126 for the site may filter the tunneled traffic of determine which aspects of the tunneled traffic are to be recorded (e.g., only a login request and a latest activity) for analysis. The monitor 126 may collect tunneled traffic during a training period to assure that a sufficient amount of tunneled traffic (where "significant" may be defined by a network administrator) is collected to accurately infer the calculated site location 220.

In different aspects, traffic of individual entities may be collected separately by the monitor 126 or in conjunction with other entities. For example, a device may have its tunneled traffic collected independently of the traffic associated with a user account logged into that device, or the traffic associated with the device/account pair may be collected in as a single set of traffic data.

At OPERATION 330 the entity locations are determined. In various aspects, entity locations may be determined when a login request is received, after a set duration of connection to the site 120, on a schedule set on the site 120, or whenever the address used by the remote device 130 changes during a connectivity session with the site 120 (e.g., via a wireless handoff), and combinations thereof. For example, an entity may have its location determined from an initial login time and every five minutes thereafter or an entity may have its location determined from an initial login time and at every five minute interval of the hour (e.g., at 8:55, 9:00, 9:05, 9:10, 9:15, etc.) thereafter. In another example, a remote device 130 may be used while an employee is commuting into work (e.g., via train, bus, carpool) and the address may be updated as the remote device 130 is handed off to new connectivity providers (e.g., Wi-Fi hotspots, cell towers), and the monitor 126 may be interested in the geolocation of each of the addresses used by the remote device 130 along the commute.

To determine the location of the entity remotely connected to the site 120, the monitor 126 will query a geolocation service 150 to provide geographic coordinates based on an IP address (or other identifier) sent in the login request or subsequent communication from the remote device 130. In some aspects, the communications from the remote device 130 may be flagged as using a separate tunneling service or an ISP that has proven unreliable in providing addresses to devices that can be reliably geolocated, in which case the monitor 126 may not determine the location for the entity. In other aspects, connection attempts that are made by a given entity in rapid succession that are indicative of connectivity problems may be aggregated into a single connection attempt for determining the location of the entity.

OPTIONAL OPERATION 340 allows for the monitor 126 to filter the IP addresses or geographic information received at the previous operations to remove spurious results, to give greater or lesser weight to various data, to split the entities into subgroups, or combine location data from multiple sites. In various aspects, optional operation 340 may be run recursively, such that filtered data are further filtered by the monitor 126.

At OPERATION 350 the monitor determines or infers the physical location of the site 120 from the geolocation data from the remote devices 130 that have connected to the site 120 over a designated time period (e.g., a learning period, the last X days of operation). The geolocations of the entities remotely connected to the enterprise network 110 may be averaged as mean values for the calculated site location 220, or the monitor 126 may apply various weights or adjustments for the geolocation values of located remote logins 210, including additional or recursive filtering per OPTIONAL OPERATION 340. For example, the monitor 126 may compare an initial calculated site location 220 against a definition file of forbidden locations to locate the site 120 (e.g., in bodies of water, parks, restricted spaces) and adjust the calculation accordingly. When the physical site location 230 of one site 120 is known, the parameters used to filter and adjust the calculation to determine the associated calculated site location 220 may be adjusted until the calculated site location 220 and the physical site location 230 match, and the parameters may then be applied to the calculations for sites 120 whose physical site location 230 are not known, which may include hypothetical sites 120 to which the enterprise network 110 may be reorganized when its physical footprint is grown, shrunk, or adjusted.

At OPTIONAL OPERATION 360 the monitor 126 assigns the calculated site location 220 to local devices 140 that connect to the given site 120. These locations may be transmitted back to the "home" site 120 to which the entities are mapped for implementation of one or more security protections.

Method 300 may then conclude.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
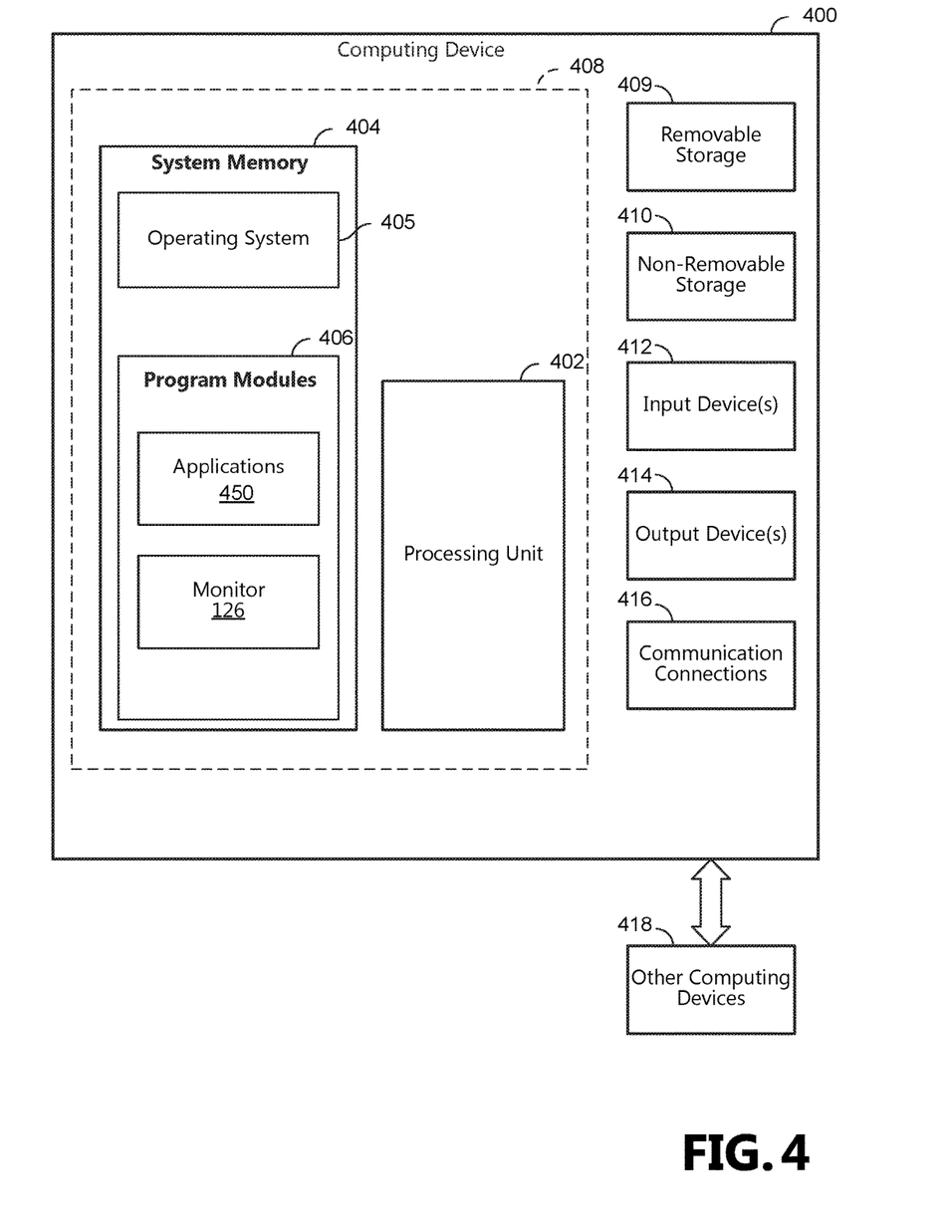
FIG. 4 is a block diagram illustrating example physical components of a computing device.
Figure 5A:
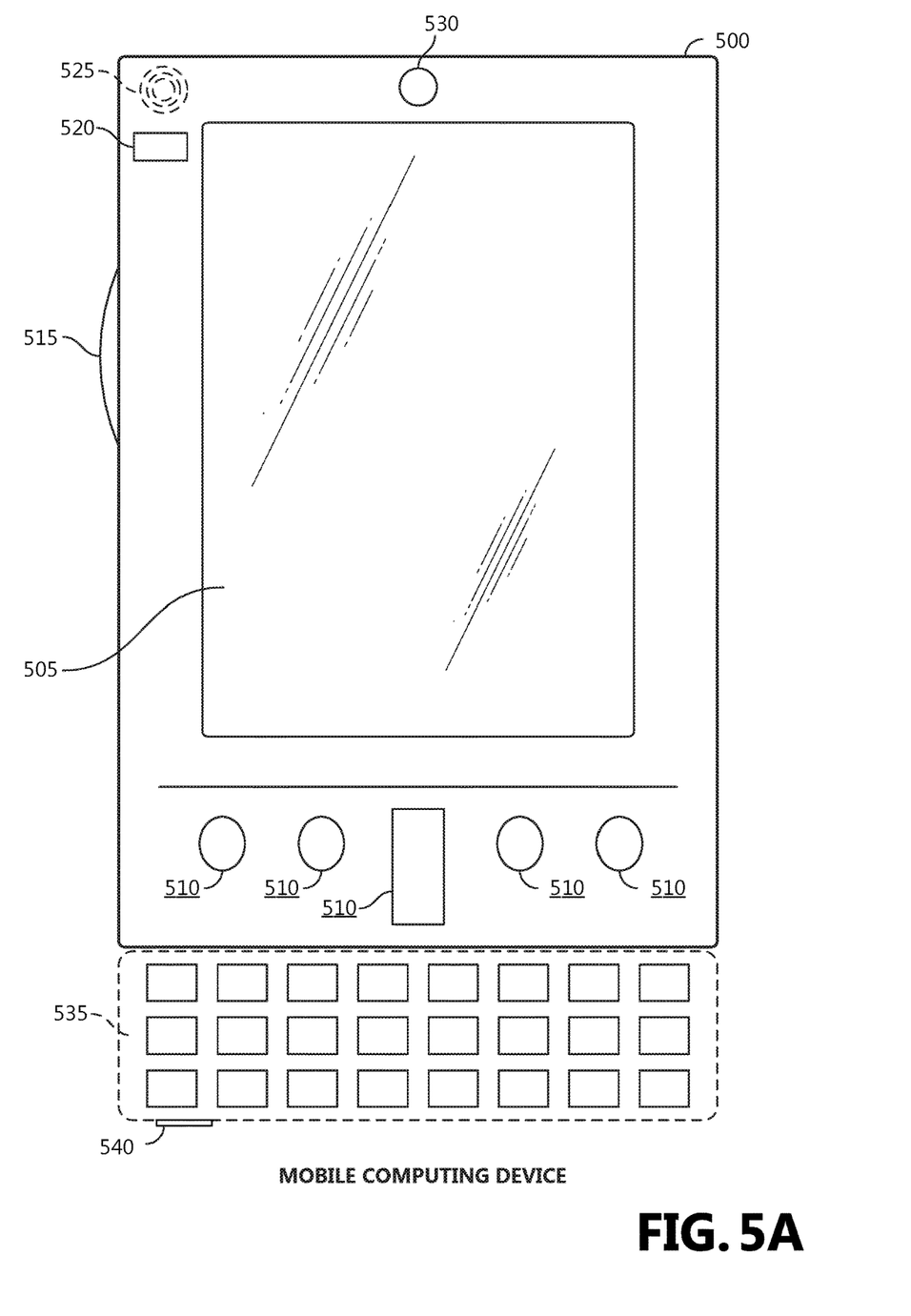
FIGS. 5A and 5B are block diagrams of a mobile computing device.
Figure 5B:
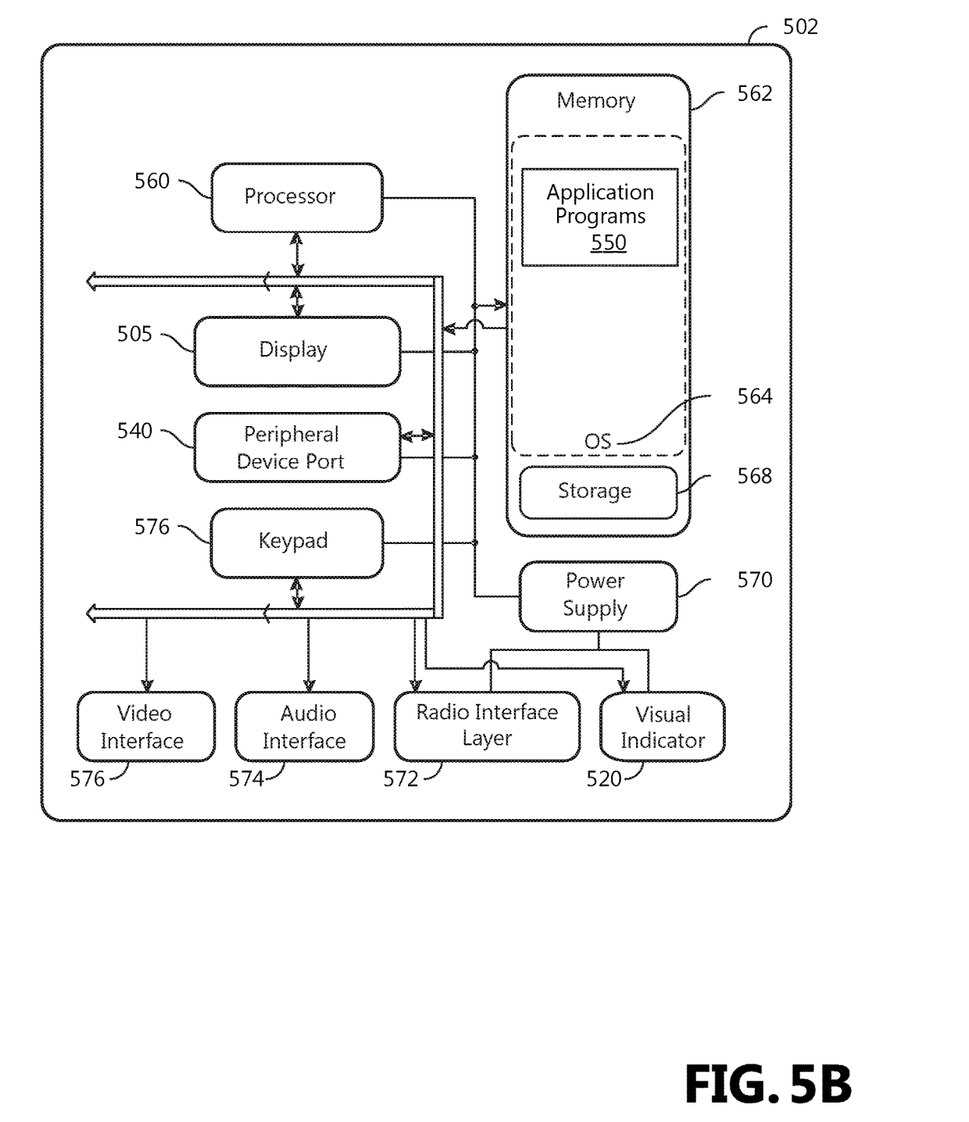

FIGS. 4-5B and the associated descriptions provide a discussion of a variety of operating environments in which examples are practiced. However, the devices and systems illustrated and discussed with respect to FIGS. 4-5B are for purposes of example and illustration and are not limiting of a vast number of computing device configurations that are used for practicing aspects, described herein.

FIG. 4 is a block diagram illustrating physical components (i.e., hardware) of a computing device 400 with which examples of the present disclosure may be practiced. In a basic configuration, the computing device 400 includes at least one processing unit 402 and a system memory 404. According to an aspect, depending on the configuration and type of computing device, the system memory 404 comprises, but is not limited to, volatile storage (e.g., random access memory), non-volatile storage (e.g., read-only memory), flash memory, or any combination of such memories. According to an aspect, the system memory 404 includes an operating system 405 and one or more program modules 406 suitable for running software applications 450. According to an aspect, the application 450 includes a monitor 126, which is operable to infer the location of a site 120 and track the locations of various devices to improve the efficiency and security of an enterprise network 110. The operating system 405, for example, is suitable for controlling the operation of the computing device 400. Furthermore, aspects are practiced in conjunction with a graphics library, other operating systems, or any other application program, and are not limited to any particular application or system. This basic configuration is illustrated in FIG. 4 by those components within a dashed line 408. According to an aspect, the computing device 400 has additional features or functionality. For example, according to an aspect, the computing device 400 includes additional data storage devices (removable and/or non-removable) such as, for example, magnetic disks, optical disks, or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 (e.g., applications 450) perform processes including, but not limited to, one or more of the stages of the method 300 illustrated in FIG. 3. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 400 has one or more input device(s) 412 such as a keyboard, a mouse, a pen, a sound input device, a touch input device, etc. The output device(s) 414 such as a display, speakers, a printer, etc. are also included according to an aspect. The aforementioned devices are examples and others may be used. According to an aspect, the computing device 400 includes one or more communication connections 416 allowing communications with other computing devices 418. Examples of suitable communication connections 416 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) According to an aspect, computer storage media include RAM, ROM, electrically erasable programmable read-only memory (EE- PROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. According to an aspect, any such computer storage media are part of the computing device 400. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which aspects may be practiced. With reference to FIG. 5A, an example of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. According to an aspect, the display 505 of the mobile computing device 500 functions as an input device (e.g., a touch screen display). If included, an optional side input element 515 allows further user input. According to an aspect, the side input element 515 is a rotary switch, a button, or any other type of manual input element. In alternative examples, mobile computing device 500 incorporates more or fewer input elements. For example, the display 505 may not be a touch screen in some examples. In alternative examples, the mobile computing device 500 is a portable phone system, such as a cellular phone. According to an aspect, the mobile computing device 500 includes an optional keypad 535. According to an aspect, the optional keypad 535 is a physical keypad. According to another aspect, the optional keypad 535 is a "soft" keypad generated on the touch screen display. In various aspects, the output elements include the display 505 for showing a graphical user interface (GUI), a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 500 incorporates peripheral device port 540, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 incorporates a system (i.e., an architecture) 502 to implement some examples. In one example, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated personal digital assistant (PDA) and wireless phone.

According to an aspect, one or more application programs 550 are loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 is used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

According to an aspect, the system 502 has a power supply 570, which is implemented as one or more batteries. According to an aspect, the power supply 570 further includes an external power source, such as an AC adapter or a powered docking cradle that supplements or recharges the batteries.

According to an aspect, the system 502 includes a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

According to an aspect, the visual indicator 520 is used to provide visual notifications and/or an audio interface 574 is used for producing audible notifications via the audio transducer 525. In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. According to an aspect, the system 502 further includes a video interface 576 that enables an operation of an on-board camera 530 to record still images, video stream, and the like.

According to an aspect, a mobile computing device 500 implementing the system 502 has additional features or functionality. For example, the mobile computing device 500 includes additional data storage devices (removable and/or non-removable) such as, magnetic disks, optical disks, or tape. Such additional storage is illustrated in FIG. 5B by the non-volatile storage area 568.

According to an aspect, data/information generated or captured by the mobile computing device 500 and stored via the system 502 are stored locally on the mobile computing device 500, as described above. According to another aspect, the data are stored on any number of storage media that are accessible by the device via the radio 572 or via a wired connection between the mobile computing device 500 and a separate computing device associated with the mobile computing device 500, for example, a server computer in a distributed computing network, such as the Internet. As should be appreciated such data/information are accessible via the mobile computing device 500 via the radio 572 or via a distributed computing network. Similarly, according to an aspect, such data/information are readily transferred between computing devices for storage and use according to well-known data/information transfer and storage means, including electronic mail and collaborative data/information sharing systems.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method for improving a network, comprising:
   collecting tunneled traffic directed to a site of the network, the tunneled traffic including network address information for remote devices;
   determining, based on the network address information, geographic coordinates for the remote devices; and
   aggregating the geographic coordinates for the remote devices to produce a calculated site location for the site, comprising:
      assigning weights to the geographic coordinates, wherein the weights are based on:
         a frequency associated with a given entity connecting to the site;
         a distance from the geographic coordinates to the calculated site location; and
         a temporal proximity of a first login attempt to a subsequent login attempt for the given entity.

2. The method of claim 1, further comprising:
   mapping entities to the site, wherein the entities mapped to the site are entities that access the network most frequently via the site; and
   wherein aggregating the geographic coordinates for the remote devices aggregates the geographic coordinates for the remote devices that are associated with the entities mapped to the site.

3. The method of claim 2, wherein the entities include:
   user accounts; and
   devices.

4. The method of claim 1, further comprising:
   comparing the calculated site location to a definition file comprising forbidden locations; and
   in response to the calculated site location matching a forbidden location of the definition file, adjusting the calculated site location so that the adjusted calculated site location does not match the forbidden location.

5. The method of claim 4, further comprising:
   when a previous session on the network for an entity was a local session from a local device connected to the network, assigning the calculated site location as a location for the previous session.

6. The method of claim 1, wherein determining the geographic coordinates for the remote devices comprises:
   querying a geolocation service with IP addresses associated with the remote devices;
   in response to querying the geolocation service, receiving the geographic coordinates from the geolocation service.

7. The method of claim 1, wherein the geographic coordinates are provided as a latitude coordinate and a longitude coordinate.

8. The method of claim 1, further comprising:
   filtering the geographic coordinates to exclude data from the remote devices that:
      are located a preset distance from the calculated site location;
      specify a particular site in the network to which to connect; or
      are associated with an Internet Service Provider known to provide addresses that are unreliable for geolocation.

9. The method of claim 1, wherein aggregating the geographic coordinates for the remote devices to produce the calculated site location further comprises:
   clustering the geographic coordinates to a centralized location for each cluster of the geographic coordinates.

10. A system for improving a network comprised of a plurality of sites to which devices may access the system locally or remotely, wherein each site comprises:
    a gateway, operable to accept communications from the devices accessing a given site of the network;
    a domain controller, in communication with the gateway, operable to authenticate entities seeking to access the network at the given site; and
    a monitor, in communication with the domain controller, operable to aggregate connection information from the devices accessing the given site remotely to infer a calculated site location for the given site, wherein to infer the calculated site location, the monitor is operable to:

collect tunneled traffic to the given site from the devices, wherein each of the devices is associated with an IP address that is included in the tunneled traffic;

determine a geolocation for each of the devices based on the IP address associated with each of the devices;

aggregate the geolocation for each device into a centralized location for the devices, wherein the aggregation comprises an assignment of weight to the geolocation for each device, and the weight is based on:
- a frequency associated with a given entity connecting to the given site;
- a distance from the geolocation to the centralized location; and
- a temporal proximity of a first login attempt to a subsequent login attempt for the given entity; and assign the centralized location as the calculated site location for the given site.

11. The system of claim 10, wherein the monitor is further operable to observe the tunneled traffic to determine whether the geolocation for a given device corresponds to a forbidden location.

12. The system of claim 11, wherein the monitor is further operable to use the calculated site location as a location for a previous login session when the previous session was made from a local device within the network.

13. The system of claim 11, wherein the monitor is further operable to use the calculated site location as a location for a current login session when the current login session is made from a local device within the network and a previous session was made from a remote device.

14. The system of claim 10, wherein the monitor is further operable to filter the geolocation for each of the devices to exclude data from:
- devices located a preset distance from the calculated site location;
- devices that specify a particular site in the network to which to connect; and
- the tunneled traffic that originates from an Internet Service Provider known to provide addresses that are unreliable for geolocation.

15. A nonvolatile computer-readable storage medium including instructions to improve a network, which when executed by a processor are operable to:

map entities to sites comprising the network based on an activity level of an entity on a given site within the network;

collect tunneled traffic directed to the given site of the network by the entities mapped to the given site, the tunneled traffic including network address information for remote devices used by the entities and identifiers to identify the entities;

determine, based on the network address information, geographic coordinates for the remote devices; and produce a calculated site location for the given site by aggregating the geographic coordinates for the remote devices, the aggregation comprising an assignment of weights to the geographic coordinates, wherein the weights are based on:
- a frequency associated with a given entity connecting to the given site;
- a distance from the geographic coordinates to the calculated site location; and
- a temporal proximity of a first login attempt to a subsequent login attempt for the given entity.

16. The nonvolatile computer-readable storage medium of claim 15, wherein the activity level of the entity on the given site within the network includes local connections to the network and the tunneled traffic.

17. The nonvolatile computer-readable storage medium of claim 15, wherein the tunneled traffic is collected during a learning period before producing the calculated site location.

18. The nonvolatile computer-readable storage medium of claim 15, wherein the given site for which the calculated site location is produced is a hypothetical location for a new site when modifying a physical footprint for the network.

19. The nonvolatile computer-readable storage medium of claim 15, wherein the given site for which the calculated site location is produced is associated with a known physical location for a first site in the network, wherein parameters for producing the calculated site location are modified to match the calculated site location to the known physical location; and determining a second calculated site location for a second site in the network using the parameters.

* * * * *